United States Patent
Mattson et al.

(10) Patent No.: US 9,109,711 B2
(45) Date of Patent: Aug. 18, 2015

(54) APPARATUS TO VISUALLY INDICATE A LEAK FROM A RELIEF VALVE

(71) Applicant: Tescom Corporation, Elk River, MN (US)

(72) Inventors: Scott Douglas Mattson, Zimmerman, MN (US); Eric Jacob Burgett, Maple Grove, MN (US); Thomas William Logan, Rogers, MN (US)

(73) Assignee: TESCOM CORPORATION, Elk River, MN (US)

( * ) Notice: Subject to any disclaimer, the term of this patent is extended or adjusted under 35 U.S.C. 154(b) by 203 days.

(21) Appl. No.: 13/720,592

(22) Filed: Dec. 19, 2012

(65) Prior Publication Data

US 2013/0167952 A1     Jul. 4, 2013

Related U.S. Application Data (60) Provisional application No. 61/582,027, filed on Dec. 30, 2011.

(51) Int. Cl.
*F16K 17/16*  (2006.01)
*F16K 37/00*  (2006.01)
*F16K 17/04*  (2006.01)

(52) U.S. Cl.
CPC ............... *F16K 37/00* (2013.01); *F16K 17/04* (2013.01); *F16K 37/0008* (2013.01); *F16K 37/0058* (2013.01); *Y10T 137/8158* (2015.04)

(58) Field of Classification Search
CPC . F16K 37/0058; F16K 17/04; F16K 37/0008; F16K 37/00

USPC .............. 137/68.18, 551, 557, 223, 225, 226, 137/227, 230, 377; 116/264, 276
See application file for complete search history.

(56) References Cited

U.S. PATENT DOCUMENTS

| | | | | |
|---|---|---|---|---|
| 1,846,311 | A | | 2/1932 | Clare |
| 2,297,378 | A | * | 9/1942 | Wittenberg .................. 137/534 |
| 2,570,655 | A | * | 10/1951 | Druge ........................... 137/493 |
| 2,631,607 | A | * | 3/1953 | Keller ........................... 137/494 |

(Continued)

FOREIGN PATENT DOCUMENTS

| | | |
|---|---|---|
| GB | 1261048 | 1/1972 |
| GB | 2069139 | 8/1981 |

(Continued)

OTHER PUBLICATIONS

PCT, "International Search Report," issued in connection with PCT Application No. PCT/US2012/070818, dated May 7, 2013 (3 pages).

(Continued)

*Primary Examiner* — Craig Schneider
*Assistant Examiner* — Minh Le
(74) *Attorney, Agent, or Firm* — Hanley, Flight & Zimmerman, LLC (57) ABSTRACT

Apparatus to visually indicate a leak from a relief valve are disclosed. In one example, an apparatus is disclosed that includes a pipe plug having a head and a shaft. The pipe plug is to attach to a relief valve. An opening is to extend through the head and shaft. The apparatus also includes a first flexible membrane to cover an end of the opening. In some examples, the first flexible membrane is to expand when fluid is released via the relief valve into the opening of the pipe plug.

20 Claims, 7 Drawing Sheets

(56) References Cited

U.S. PATENT DOCUMENTS

| | | | |
|---|---|---|---|
| 3,111,930 A | 11/1963 | Zipper | |
| 3,241,514 A | 3/1966 | Grimland | |
| 3,452,708 A * | 7/1969 | Richardson | 116/34 R |
| 3,459,218 A * | 8/1969 | Cranage | 137/557 |
| 3,490,488 A * | 1/1970 | Grist | 137/512.4 |
| 3,492,968 A | 2/1970 | Workman, Jr. | |
| 3,703,879 A * | 11/1972 | Huthsing, Jr. | 116/270 |
| 3,780,693 A * | 12/1973 | Parr | 116/270 |
| 3,844,310 A * | 10/1974 | Brindisi | 137/557 |
| 4,263,929 A * | 4/1981 | Kearney | 137/68.18 |
| 4,366,708 A * | 1/1983 | Warihashi | 73/146.8 |
| 4,579,001 A * | 4/1986 | Hosterman | 73/714 |
| 4,606,391 A * | 8/1986 | Achterholt | 152/431 |
| 4,819,686 A * | 4/1989 | Achterholt | 137/229 |
| 4,887,730 A * | 12/1989 | Touzani | 215/271 |
| 4,978,947 A * | 12/1990 | Finnegan | 340/611 |
| 5,189,979 A * | 3/1993 | Popenoe | 116/273 |
| 5,507,311 A * | 4/1996 | Combe | 137/524 |
| 5,664,601 A * | 9/1997 | Chen | 137/551 |
| 5,673,563 A | 10/1997 | Albertson et al. | |
| 5,694,117 A * | 12/1997 | Sugarek | 340/626 |
| 5,775,358 A * | 7/1998 | Fawcett et al. | 137/68.18 |
| 5,852,986 A * | 12/1998 | Mackal | 116/266 |
| 6,209,749 B1 * | 4/2001 | Guess | 220/724 |
| 7,185,955 B2 * | 3/2007 | Dombroski | 301/108.1 |
| 8,695,631 B2 * | 4/2014 | Hasegawa | 137/512.2 |
| 2007/0282181 A1 * | 12/2007 | Findlay et al. | 600/323 |
| 2011/0079295 A1 * | 4/2011 | Nunez et al. | 137/347 |
| 2012/0145248 A1 * | 6/2012 | Huff et al. | 137/1 |

FOREIGN PATENT DOCUMENTS

| | | | |
|---|---|---|---|
| GB | 2274919 A * | 8/1994 | G01M 3/12 |
| JP | 10196822 A * | 7/1998 | |
| WO | 2011057554 | 5/2011 | |

OTHER PUBLICATIONS

PCT, "Written Opinion," issued in connection with PCT Application No. PCT/US2012/070818, dated May 7, 2013 (7 pages).

* cited by examiner

APPARATUS TO VISUALLY INDICATE A LEAK FROM A RELIEF VALVE

RELATED APPLICATION

This patent claims the benefit of provisional application Ser. No. 61/582,027, which was filed on Dec. 30, 2011, and which is incorporated herein by reference in its entirety.

FIELD OF THE DISCLOSURE

This disclosure relates generally to valves and, more particularly, to apparatus to visually indicate a leak from a relief valve.

BACKGROUND

Relief valves are often used to control or limit the pressure in pipes to which they are connected by releasing any pressure built up within the pipes (e.g., when an on/off valve or pressure regulator leaks). Various apparatus and/or methods have been developed to indicate when there is a leak via a relief valve to an operator or other plant personnel to be able to identify and appropriately respond to such a leak.

SUMMARY

Apparatus to visually indicate a leak from a relief valve are disclosed. In one example, an apparatus is disclosed that includes a pipe plug having a head and a shaft. The pipe plug is to attach to a relief valve. An opening is to extend through the head and shaft. The apparatus also includes a first flexible membrane to cover an end of the opening. In some examples, the first flexible membrane is to expand when fluid is released via the relief valve into the opening of the pipe plug. In some examples, the first flexible membrane includes a hole to release pressure built up in the opening by the fluid released via the relief valve. In some examples, the first flexible membrane is to expand to a first size under a first pressure in the opening and expand to a second size under a second pressure in the opening. In such examples, a size of the expanded membrane is to indicate an amount of pressure released by the relief valve.

In some examples, the apparatus further includes a second flexible membrane disposed beneath the first flexible membrane. The second flexible membrane to be a different color than the first flexible membrane. In some such examples, an opacity of the first flexible membrane is to decrease when the first flexible membrane is expanded to expose the second flexible membrane. In other such examples, the first flexible membrane is to burst when a pressure in the opening expands the first flexible membrane beyond a failure point to expose the second flexible membrane. In yet other such examples, the first flexible membrane is to burst when a pressure in the opening expands the first flexible membrane beyond a failure point to expose the head of the pipe plug, the head of the pipe plug to be a different color than the first flexible membrane.

In some examples, the apparatus also includes an o-ring to secure the first flexible membrane over the opening of the pipe plug. In some examples, the first flexible membrane is secured to the pipe plug via at least one of an adhesive or welding. In some examples, the first flexible membrane is to glow in the dark. In some examples, the relief valve and the pipe plug are to be disposed within a transparent tube that is sealed off from an external environment.

Another example apparatus disclosed herein includes a pipe plug including a head and a threaded shaft. The pipe plug is to be threaded to be coupled to a relief valve. An opening is to extend through the shaft and the head of the pipe plug. The apparatus also includes a first flexible membrane to be secured to the head of the pipe plug to enclose the opening. In some examples, the first flexible membrane is to inflate under pressure produced by fluid released by the relief valve into the opening. In some examples, the first flexible membrane includes a hole to release excess pressure within the opening. In some examples, the apparatus further includes a second flexible membrane disposed beneath the first flexible membrane. The first flexible membrane is to at least one of become translucent as the first flexible membrane expands or burst when the first flexible membrane expands beyond a failure point to expose the second flexible membrane. In such examples, the second flexible membrane to be a different color than the first flexible membrane. In some examples, the first flexible membrane is to burst when the first flexible membrane expands beyond a failure point to expose the head of the pipe plug, the head of the pipe plug to be a different color than the first flexible membrane. In some examples, the first flexible membrane is secured over the head of the pipe plug via at least one of an o-ring, an adhesive or welding.

In another example disclosed herein, an apparatus includes a pipe plug to be fastened to a relief valve. The pipe plug is to have an opening extending through the pipe plug to enable a fluid released by the relief valve to pass through the pipe plug. The apparatus further includes a flexible membrane secured to the pipe plug to cover an end of the opening opposite the relief valve. The flexible membrane is to inflate under pressure of the fluid to visually indicate a release of the fluid.

DETAILED DESCRIPTION

Typically, when a relief valve is actuated to release pressure, the relief valve makes a loud hissing noise. However, in a production facility or processing plant where many noise producing processes are active and where many systems, devices, etc., may demand the attention of operators, sound (e.g., the aforementioned hissing noise) and/or its source may not be readily apparent. In some situations, operators may attach an electronic pressure indictor to send a signal to a control station to indicate when a relief valve has opened. In other situations, a filter delta pressure indicator incorporated into the system may pop up when the pressure difference across the filter increases above a set point indicative of a need to change the filter. While these methods provide a visual indication of pressure changes within a piping system they are complex and expensive. Another known approach involves taping one edge of a paper over the outlet of a relief valve to move when the relief valve is actuated. However, this is not visually appealing and the paper may be blown by the movement of air in the system from sources within the process space other than the relief valve outlet.

Figure 1A:
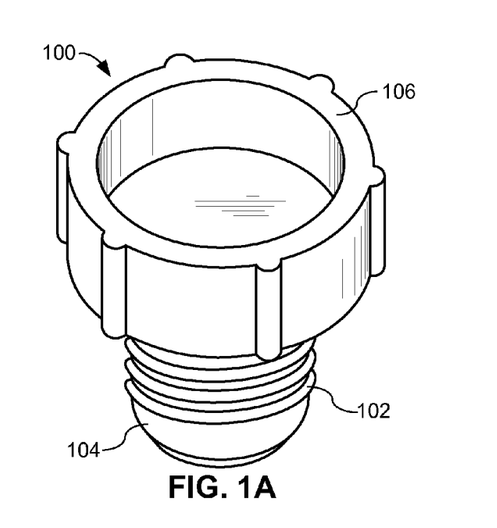
FIG. 1A is a diagram of a top perspective view of a known pipe plug.
Figure 1B:
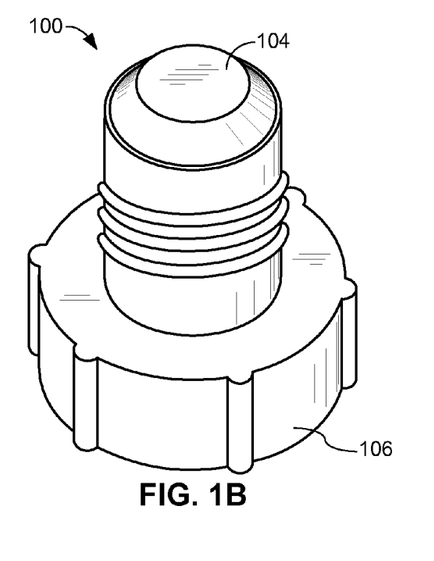
FIG. 1B is a diagram of a bottom perspective view of the known pipe plug of FIG. 1A.
Figure 1C:
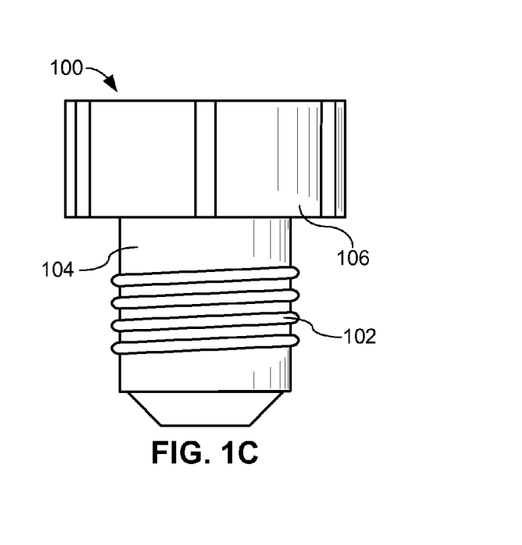
FIG. 1C is a diagram of a side view of the known pipe plug shown in FIG. 1A
Figure 1D:
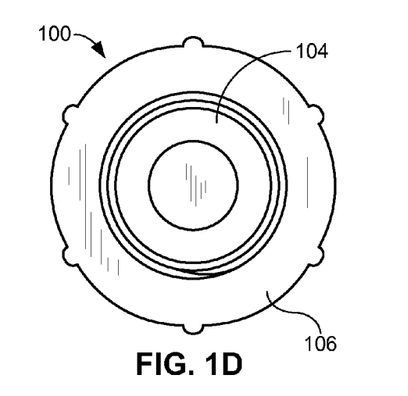
FIG. 1D is a diagram of a bottom view of the known pipe plug shown in FIG. 1A.

FIGS. 1A and 1B are diagrams of respective top and bottom perspective views of a known plastic pipe plug 100. FIGS. 1C and 1D are schematic diagrams of the side and bottom views of the known pipe plug shown in FIGS. 1A and 1B, respectively. The plug 100 and plugs similar to the plug 100 are commonly used in industry to close off the end of a pipe or other fluid flow component. In particular, the plug 100 has threads 102 on at least a portion of a shaft 104 that may be fastened to the end of an internally threaded pipe (not shown) by rotating a head 106 of the plug 100 to seal off the end of the pipe.

Figure 2A:
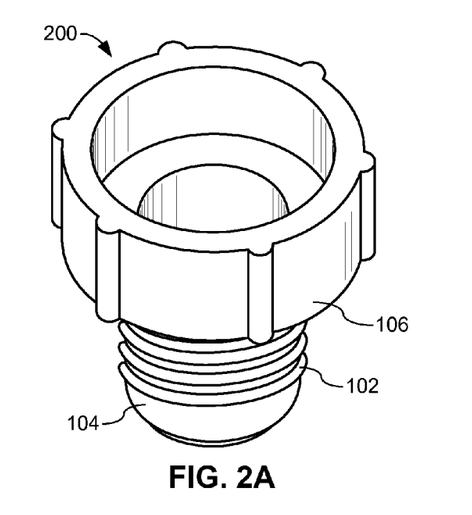
FIG. 2A is a diagram of a top perspective view of an example pipe plug having a hole through the center of the plug in accordance with the teachings disclosed herein.
Figure 2B:
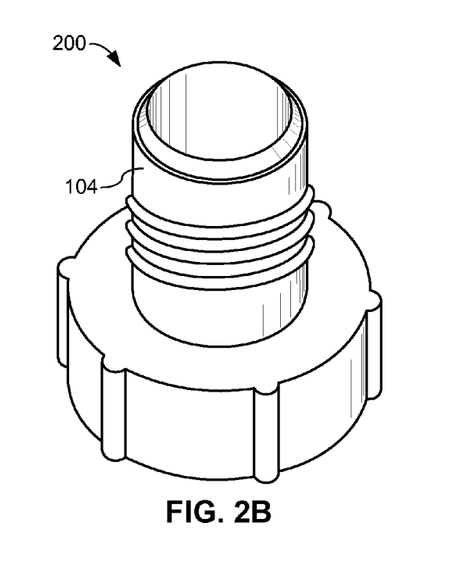
FIG. 2B is a diagram of a bottom perspective view of the example pipe plug shown in FIG. 2A.
Figure 2C:
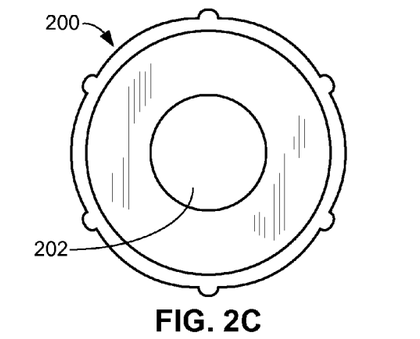
FIG. 2C is a diagram of the top view of the example pipe plug shown in FIG. 2A.
Figure 2D:
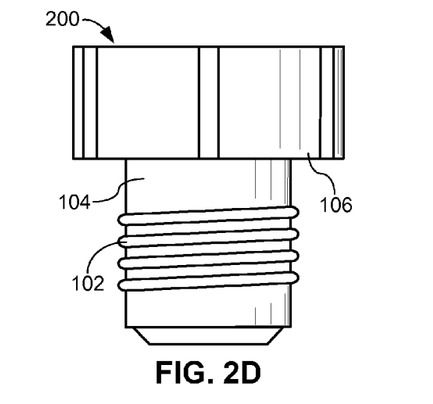
FIG. 2D is a diagram of the side view of the example pipe plug shown in FIG. 2A.
Figure 2E:
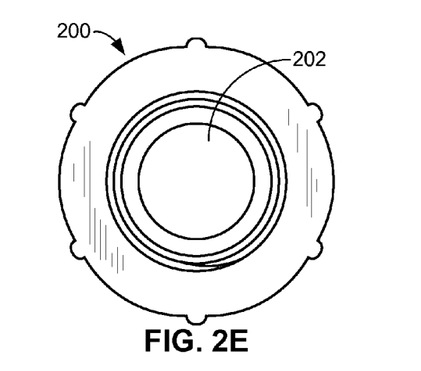
FIG. 2E is a diagram of the bottom view of the example pipe plug shown in FIG. 2A.

FIGS. 2A-2B are diagrams of respective top and bottom perspective views of an example pipe plug 200. FIGS. 2C-2E are respective schematic diagrams of the top, side, and bottom views of the example pipe plug shown in FIGS. 2A-2C, respectively. The example pipe plug 200 is similar to the plug 100 of FIGS. 1A-1D with the same threads 102, shaft 104, and head 106. However, the example plug 200 of FIGS. 2A-2E is unlike many known pipe plugs (e.g., the plug 100) because the example plug 200 has a hole or opening 202 that extends through the shaft 104 and head 106 of the plug 200. As shown in FIG. 2A, the head already has an opening in the top but it does not extend all the way through the head 106. Accordingly, if the example plug 200 is threaded to the end of a pipe (not shown), fluid in the pipe would be able to pass through the plug 200.

Figure 3A:
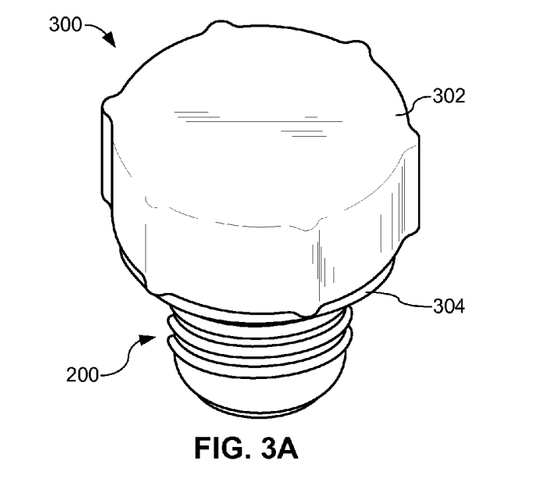
FIG. 3A is a diagram of a top perspective view of an example visual leak indicator for a relief valve in accordance with the teachings disclosed herein.
Figure 3B:
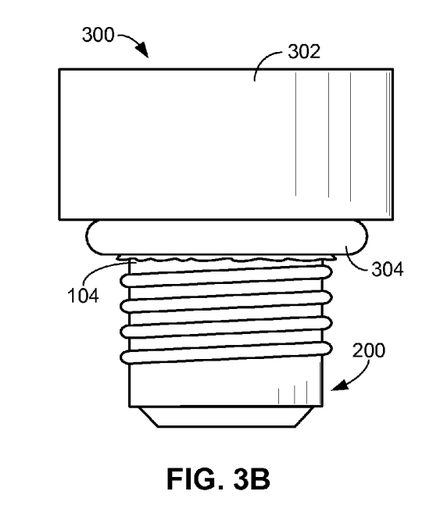
FIG. 3B is a diagram of the side view of the example visual leak indicator shown in FIG. 3A.
Figure 3C:
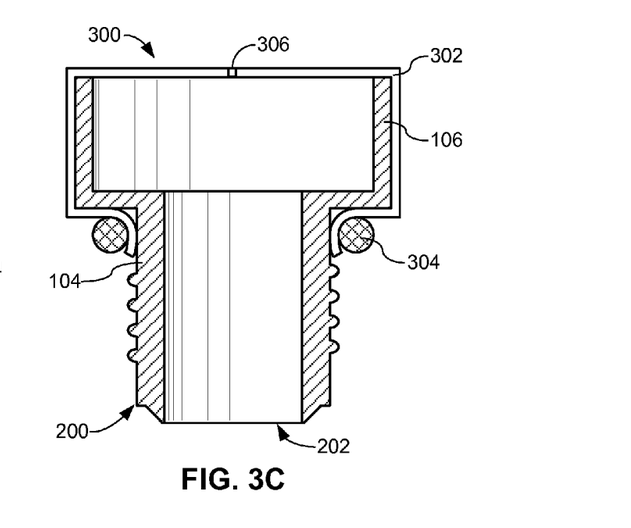
FIG. 3C is a cross-sectional diagram of the example visual leak indicator shown in FIG. 3A.

FIG. 3A is a diagram of a top perspective view of an example visual leak indicator 300 for a relief valve in accordance with the teachings disclosed herein. FIG. 3B is a schematic diagram of the side view of the example visual leak indicator 300 shown in FIG. 3A. FIG. 3C is a cross-sectional diagram of the example visual leak indicator 300 shown in FIG. 3B. In some examples, the visual indicator 300 includes the plug 200, a flexible membrane 302, and an o-ring 304.

As shown in FIGS. 3A-3C, the flexible membrane 302 is placed around the head 106 of the plug 200 and secured in place against the shaft 104 with the o-ring 304. In this manner, the top end of the plug 200 is covered or enclosed. However, as shown in FIG. 3C, the membrane 302 has a small hole 306 (e.g., a pin hole) to release excess pressure built up within the visual leak indicator 300 to the other side of the membrane 302 when the visual leak indicator 300 is connected to the outlet of a relief valve as explained in detail below. As an alternative to the o-ring 304, the flexible membrane 302 may be secured to the plug 200 in any number of ways including at least one of multiple o-rings, adhesive, welding, or any other appropriate method.

Figure 4A:
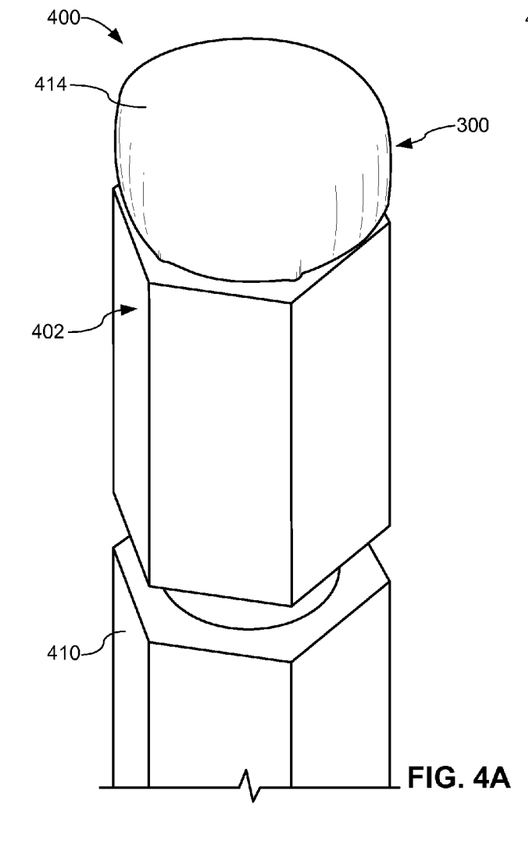
FIG. 4A is a diagram of a perspective view of an example relief valve assembly that includes the example visual leak indicator of FIGS. 3A-3C being actuated by a first pressure.
Figure 4B:
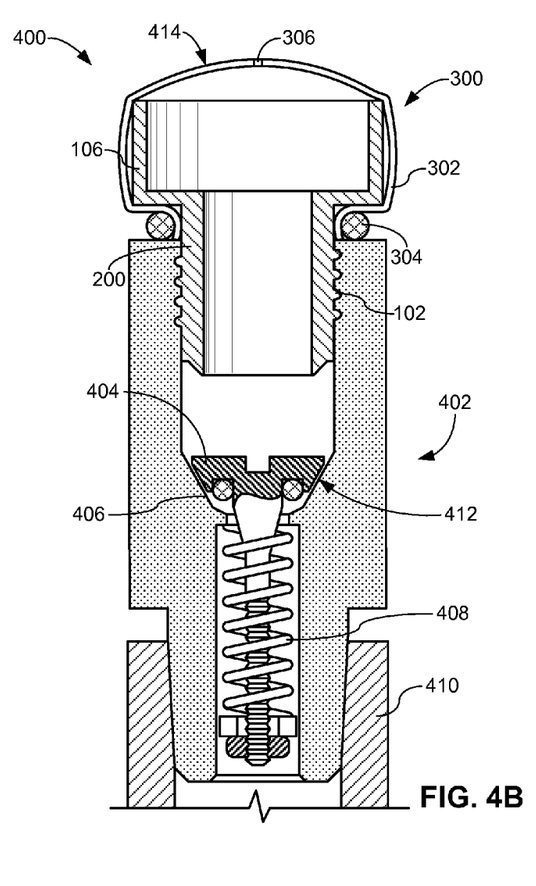
FIG. 4B is a cross-sectional diagram of the example relief valve assembly of FIG. 4A.
Figure 4C:
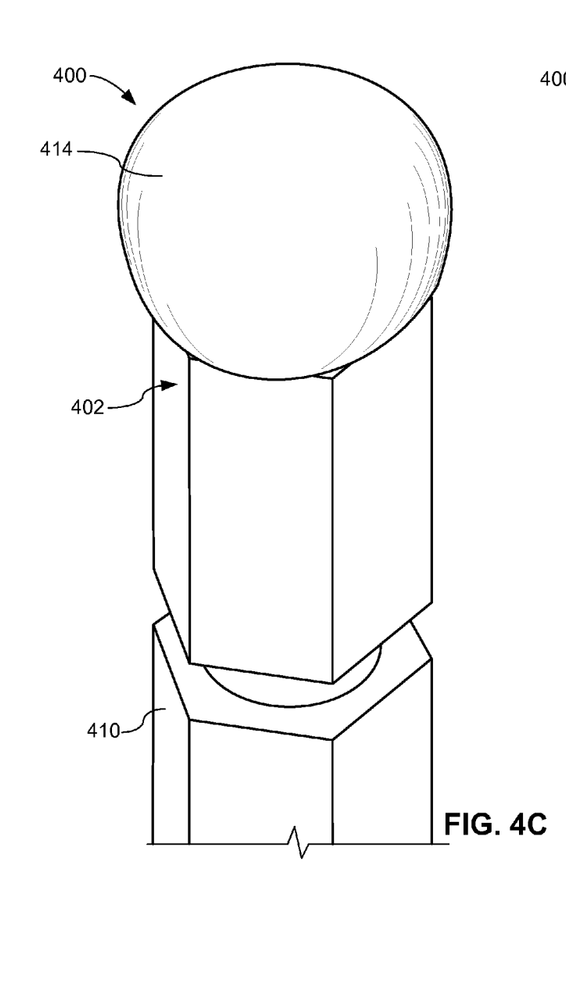
FIG. 4C is a diagram of a perspective view of the example relief valve assembly shown in FIG. 4A being actuated by a second pressure greater than the first pressure.
Figure 4D:
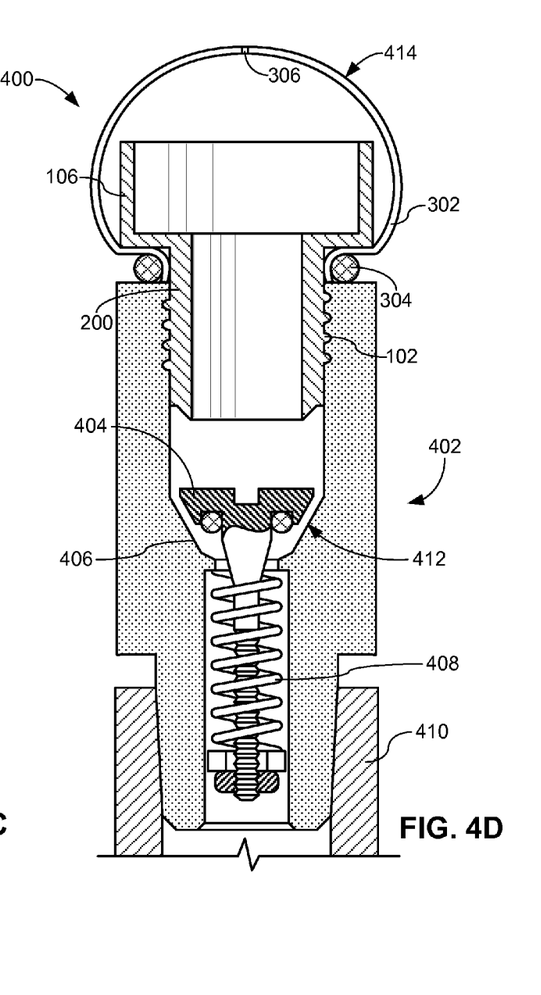
FIG. 4D is a cross-sectional diagram of the example relief valve assembly shown in FIG. 4C.

FIG. 4A is a diagram of an example relief valve assembly 400 that includes the example visual leak indicator 300 of FIGS. 3A-3C connected to a known relief valve 402 that is being actuated by a first pressure. FIG. 4B is a cross-sectional diagram of the example relief valve assembly 400 of FIG. 4A being actuated by the first pressure. FIGS. 4C and 4D are a respective perspective view and cross-sectional diagram of the example relief valve assembly 400 being actuated by a second pressure greater than the first pressure.

As shown, the example visual leak indicator 300 is connected to the relief valve 402 via the threads 102. Through the process of threading the visual indicator 300 onto the relief valve 402, the o-ring 304 is compressed between the head 106 of the plug 200 and the relief valve 402. This compressive force passes through the membrane 302 to further secure the membrane 302 in place over the head 106 of the plug 200.

The relief valve 402 is shown with a disc 404 that is forced against a valve seat 406 via the force of a spring 408. Furthermore, the relief valve 402 is shown connected to a pipe 410. As fluid passes through the pipe 410, the fluid travels up the relief valve 402 until it reaches the disc 404 in sealing engagement with the valve seat 406. If pressure within the pipe 410 exceeds the sealing force produced by the spring 408, the disc 404 is forced upward to create a gap 412 between the disc 404 and the valve seat 406, thereby allowing fluid to pass through the relief valve 402 and reduce the pressure within the pipe 410. Furthermore, as shown in FIG. 4D, where a greater pressure is actuating the relief valve 402 than in FIG. 4B, the disk 404 is further moved to create a larger gap 412, thereby allowing more fluid to be released through the relief valve 402.

However, in the example relief valve assembly 400, once fluid has been released through the relief valve 402, the fluid passes through the opening 202 of the visual leak indicator 300 until it reaches the membrane 302. As fluid pressure builds up within the visual indicator 300, the membrane 302 inflates into a generally curved or domed shape 414 (containing a generally hemispherical profile similar to at least a portion of an inflated balloon or bubble) as the flexible membrane 302 stretches or expands. To prevent the membrane 302 from bursting or tearing the hole 306 is placed within the membrane 302 to enable the pressure within the visual indicator 300 to be released, but not before the membrane 302 is inflated into the curved shape 414. In this manner, when the relief valve 402 is actuated by a pressure, the curved shape 414 is produced to provide a visual indication that the relief valve 402 has been actuated by an excessive pressure within the pipe 410.

Additionally, as stated above, the relief valve 402 may release fluid from the pipe 410 at different pressures. As a result, the curved shape 414 may vary in size to provide a visual indication of the severity of the pressure being released from the pipe 410. For example, in FIG. 4B where a first pressure is actuating the relief valve assembly 400, the curved surface 414 is inflated to a smaller size than the size of the curved surface 414 in FIG. 4D where a second pressure, greater than the first pressure, is actuating the relief valve assembly 400. Furthermore, the pressure to be released from the pipe 410 may be high enough to exceed a threshold level that stretches the membrane 302 sufficiently to cause the curved surface 414 to burst, as will be discussed below in connection with FIG. 5.

Figure 5:
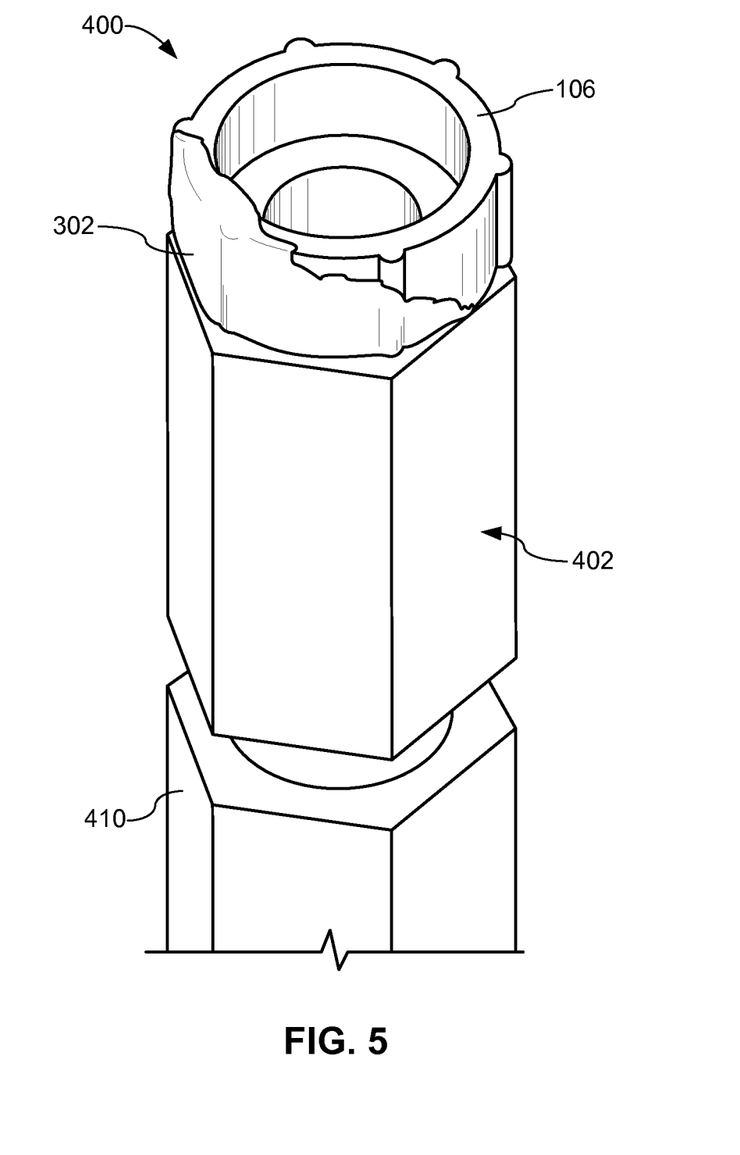
FIG. 5 is a diagram of a perspective view of the example relief valve assembly shown in FIGS. 4A-4D after the membrane has burst.

FIG. 5 is a diagram of the example relief valve assembly 400 shown in FIGS. 4A-4D after the membrane 302 has burst. As shown, when the membrane 302 bursts, because the pressure released through the relief valve 402 exceeded the capacity of the membrane 302 to stretch (offset by any pressure released via the hole 306), the head 106 of the plug 200 becomes exposed. In accordance with this disclosure, the head 106 of the plug 200 may be a different and/or brighter color than the membrane 302. In this manner, an additional visual indication of the severity of the pressure build up within the pipe 410 is provided by the sudden change of color of the end of the relief valve assembly 400 (i.e., the appearance of the exposed head 106) in circumstances where the pressure is greater than the membrane 302 can indicate by inflating.

Figure 6:
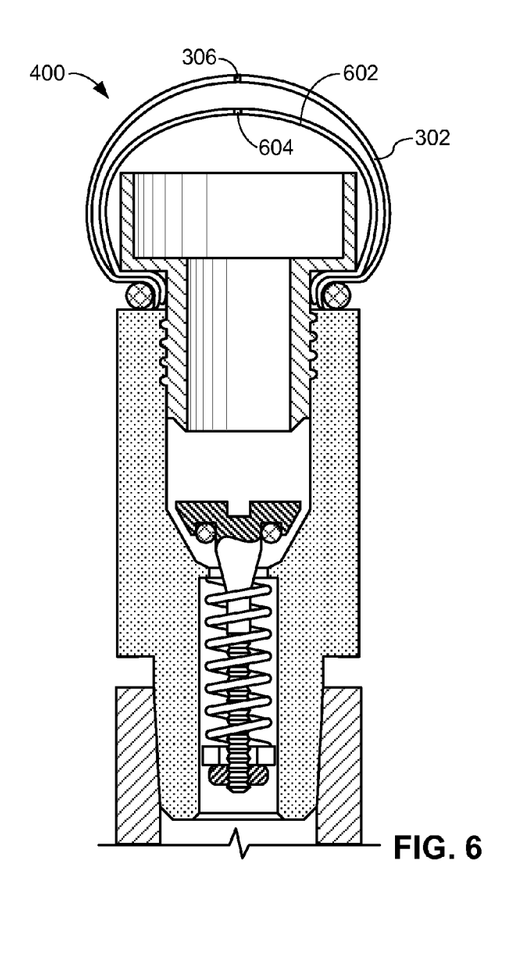
FIG. 6 is a cross-sectional diagram of the example relief valve assembly of FIG. 4D with a second membrane.

Other alternative indications of the severity of pressure being released from the pipe 410 may be incorporated into the valve relief assembly disclosed herein. One alternative includes enabling the curved surface 414 to change color as the severity of the pressure released through the relief valve 402 increases. As the membrane 302 expands to form the curved surface 414, the color and/or opacity of the stretched membrane 302 may fade and/or become nearly clear and/or translucent. Accordingly, a color changing curved surface 414 may be accomplished by including a second membrane 602 under the first membrane 302 having a different color as illustrated in FIG. 6 and a hole 604. As the first (outer) membrane 302 stretches and becomes more translucent, the color of the second (inner) membrane 602 may become visible. To indicate the increasing severity of the pressure, the color of the second membrane may be brighter than the color of the first membrane to draw attention to the increased pressure released by the relief valve assembly 400. Additional membrane layers may also be incorporated into the relief valve assembly 400.

In another alternative, multiple membranes 302, 602 may be included in an individual indicator 300 designed to burst at different pressures. For example, as the relief valve assembly 400 is actuated, each membrane 302, 602 inflates. At some point, the outer membrane 302 having one color may reach a failure point and burst, thereby revealing the inner membrane 602 having a second color. The different failure points of the membranes 302, 602 may be accomplished by varying how tight each membrane 302, 602 is initially stretched around the head 106 of the plug 200, the size of the hole 306, 604 within each membrane 302, 602 to release the built up pressure, the thickness of each membrane 302, 602, and/or the material used for each membrane 302, 602. The material used for any of the membranes 302 disclosed herein may include nitrile, latex, or any other suitable material with elastic properties.

Another alternative visual indicator 300 includes implementing a membrane 302 that can glow in the dark. A glow-in-the-dark membrane 302 may be accomplished by applying glow paint to the membrane 302 when assembling the visual indicator 300. The paint may be applied to an outer membrane 302 or a membrane 302 beneath the outer layer as described above. In some examples, the material of the membrane 302 has glow-in-the-dark properties.

Figure 7:
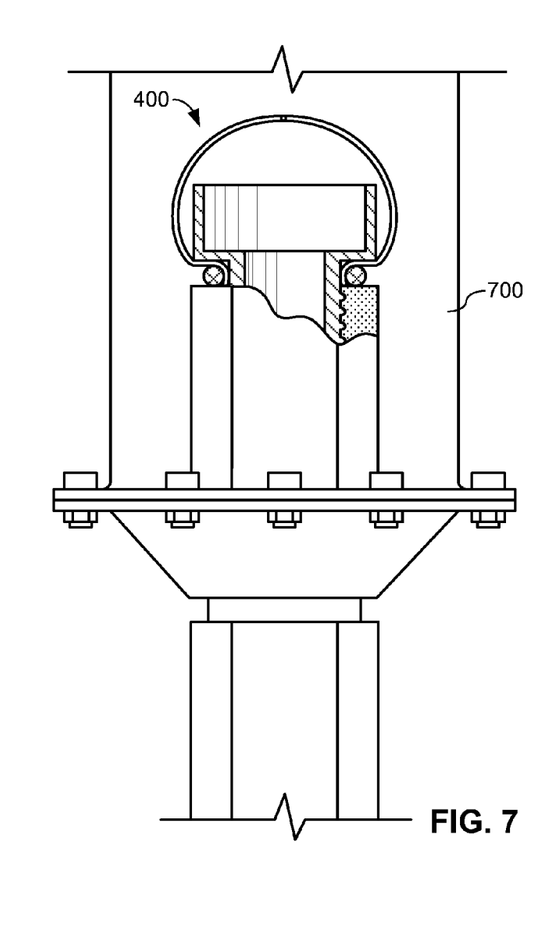
FIG. 7 is a partially cut-away view of the example relief valve assembly of FIG. 4D contained within a transparent pipe.

As described thus far, the example relief valve assembly 400 releases pressure from the pipe 410 to the atmosphere. Accordingly, the fluid being released is typically required to be safe (i.e., non-toxic, non-flammable, etc). However, the relief valve assembly 400 described herein can be adapted in a piping system to enable the capture and/or containment of the fluid released by the relief valve assembly 400. In particular, the relief valve assembly 400 may function exactly the same way for harmful fluids. To contain the release of the harmful fluid, the entire relief valve assembly 400 may be housed within a transparent pipe or tube 700 that is sealed off from an external environment as illustrated in FIG. 7. In this manner, the valve relief assembly 400 may provide a visual indication of the release of pressure without releasing harmful fluids into the atmosphere and/or work environment of the process space.

The relief valve assembly 400 and the embodiments disclosed herein may be advantageously applied in settings where the fluid released by the example relief valve assembly 400 is a gaseous fluid. However, nothing in this disclosure limits the use of the disclosed relief valve assembly 400 in any suitable setting where non-gaseous fluids are released by the relief valve assembly 400.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. An apparatus comprising:
   a pipe plug having a head and a shaft, the pipe plug to attach to a relief valve, wherein an opening is to extend through the head and shaft, the relief valve and the pipe plug disposed within a transparent tube that is sealed off from an external environment; and
   a first flexible membrane to cover an end of the opening.

2. The apparatus of claim 1, wherein the first flexible membrane is to expand when fluid is released via the relief valve into the opening of the pipe plug.

3. The apparatus of claim 2, wherein the first flexible membrane includes a hole to release pressure built up in the opening by the fluid released via the relief valve.

4. The apparatus of claim 2, wherein the first flexible membrane is to expand to a first size under a first pressure in the opening and expand to a second size under a second pressure in the opening, wherein a size of the expanded membrane is to indicate an amount of pressure released by the relief valve.

5. The apparatus of claim 2, further comprising a second flexible membrane disposed beneath the first flexible membrane, the second flexible membrane to be a different color than the first flexible membrane.

6. The apparatus of claim 5, wherein an opacity of the first flexible membrane is to decrease when the first flexible membrane is expanded to expose the second flexible membrane.

7. The apparatus of claim 5, wherein the first flexible membrane is to burst when a pressure in the opening expands the first flexible membrane beyond a failure point to expose the second flexible membrane.

8. The apparatus of claim 1, wherein the first flexible membrane is to burst when a pressure in the opening expands the first flexible membrane beyond a failure point to expose the head of the pipe plug, the head of the pipe plug to be a different color than the first flexible membrane.

9. The apparatus of claim 1, further comprising an o-ring to secure the first flexible membrane over the opening of the pipe plug.

10. The apparatus of claim 1, wherein the first flexible membrane is secured to the pipe plug via at least one of an adhesive or welding.

11. The apparatus of claim 1, wherein the first flexible membrane is to glow in the dark.

12. An apparatus comprising:
   a pipe plug including a head and a threaded shaft, the pipe plug to be threaded to be coupled to a relief valve, wherein an opening is to extend through the shaft and the head of the pipe plug; and
   a first flexible membrane to be secured to the head of the pipe plug to enclose the opening, the first flexible membrane to become translucent as the first flexible membrane expands.

13. The apparatus of claim 12, wherein the first flexible membrane is to inflate under pressure produced by fluid released by the relief valve into the opening.

14. The apparatus of claim 13, wherein the first flexible membrane includes a hole to release excess pressure within the opening.

15. The apparatus of claim 13, further comprising a second flexible membrane disposed beneath the first flexible membrane, wherein when the first flexible membrane expands and becomes translucent the second flexible membrane is exposed through the first flexible membrane, the second flexible membrane to be a different color than the first flexible membrane.

16. The apparatus of claim 15, wherein the first flexible membrane is to burst when the first flexible membrane expands beyond a failure point to expose at least one of the second flexible membrane or the head of the pipe plug, the head of the pipe plug to be a different color than the first flexible membrane.

17. The apparatus of claim 12, wherein the first flexible membrane is secured over the head of the pipe plug via at least one of an o-ring, an adhesive or welding.

18. An apparatus comprising:
   a pipe plug to be fastened to a relief valve, the pipe plug having an opening extending through the pipe plug to enable a fluid released by the relief valve to pass through the pipe plug;
   a first flexible membrane secured to the pipe plug to cover an end of the opening opposite the relief valve, the first flexible membrane to inflate under pressure of the fluid to visually indicate a release of the fluid, the first flexible membrane to burst when the pressure of the fluid passing through the pipe plug expands the first flexible membrane beyond a capacity of the first flexible membrane to stretch; and
   a second flexible membrane, wherein the second flexible membrane is exposed when the first flexible membrane bursts.

19. The apparatus of claim 18, wherein the first flexible membrane and second flexible membrane are secured over the head of the pipe plug via at least one of an o-ring, an adhesive or welding.

20. The apparatus of claim 18, wherein the second flexible membrane is to glow in the dark.

* * * * *